(12) United States Patent
Poeschl et al.

(10) Patent No.: US 8,757,226 B2
(45) Date of Patent: Jun. 24, 2014

(54) DEVICE FOR BOTTLING BEVERAGES

(75) Inventors: Stefan Poeschl, Regensburg (DE);
Rupert Meinzinger, Kirchroth (DE)

(73) Assignee: Krones AG (DE)

( * ) Notice: Subject to any disclaimer, the term of this patent is extended or adjusted under 35 U.S.C. 154(b) by 1096 days.

(21) Appl. No.: 12/675,374

(22) PCT Filed: Oct. 13, 2008

(86) PCT No.: PCT/EP2008/063708
§ 371 (c)(1),
(2), (4) Date: Feb. 25, 2010

(87) PCT Pub. No.: WO2009/050140
PCT Pub. Date: Apr. 23, 2009

(65) Prior Publication Data
US 2010/0307638 A1    Dec. 9, 2010

(30) Foreign Application Priority Data
Oct. 12, 2007 (DE) .......................... 10 2007 048 934

(51) Int. Cl.
*F16K 31/08* (2006.01)
*F16K 15/04* (2006.01)
*B67C 3/02* (2006.01)

(52) U.S. Cl.
CPC ..................................... *F16K 31/08* (2013.01)
USPC ............. 141/192; 141/198; 141/155; 251/65; 137/517; 137/533.11

(58) Field of Classification Search
CPC ........ F16K 15/04; F16K 31/086; F16K 31/08
USPC .......... 141/94, 192, 198, 155, DIG. 1, DIG. 2; 137/220, 455, 457, 459, 460, 511, 137/513.3, 513.5, 517, 519.5, 528, 624.27; 222/14, 17, 20, 59; 251/65
See application file for complete search history.

(56) References Cited

U.S. PATENT DOCUMENTS

| 2,501,511 | A | 3/1950 | Grosbois .......................... 141/44 |
| 2,880,762 | A | 4/1959 | Breeback ......................... 141/48 |

(Continued)

FOREIGN PATENT DOCUMENTS

| DE | 358171 | 9/1922 | ................. B67C 3/06 |
| DE | 1 164 867 | 3/1964 | ................. B67C 3/06 |

(Continued)

OTHER PUBLICATIONS

International Search Report received in Applicants underlying PCT Application Serial No. PCT/EP2008/063708.

(Continued)

*Primary Examiner* — Timothy L Maust
*Assistant Examiner* — Robert Bell, III
(74) *Attorney, Agent, or Firm* — Hayes Soloway P.C.

(57) ABSTRACT

A device for filling containers, includes a storage container in which a fluid that is to be bottled in the containers can be accommodated, a filling device which fills the fluid into the containers, and a transport line for transporting the fluid from the storage container to the filling device. A valve device is arranged in the transport line between the storage container and the filling device, which valve device automatically switches between an open and a closed state depending on a flow rate of the fluid within the transport line.

11 Claims, 1 Drawing Sheet

(56) References Cited

U.S. PATENT DOCUMENTS

| | | | |
|---|---|---|---|
| 3,468,338 A * | 9/1969 | Patterson | 137/517 |
| 4,224,961 A * | 9/1980 | Schnabel | 137/375 |
| 4,844,113 A * | 7/1989 | Jones | 137/39 |
| 4,883,081 A * | 11/1989 | Morris | 137/39 |
| 5,052,429 A * | 10/1991 | Yoo | 137/38 |
| 5,280,806 A * | 1/1994 | Glazebrook | 137/517 |
| 6,131,877 A * | 10/2000 | Kerger et al. | 251/65 |
| 6,398,183 B1 * | 6/2002 | Kerger et al. | 251/65 |
| 6,578,604 B1 * | 6/2003 | Adriansens | 137/614.2 |
| 6,766,824 B2 * | 7/2004 | Taylor | 137/522 |
| 7,171,981 B2 * | 2/2007 | Shade et al. | 137/533.11 |
| 7,318,592 B2 * | 1/2008 | Iwamoto et al. | 280/90 |

FOREIGN PATENT DOCUMENTS

| | | | |
|---|---|---|---|
| DE | 1 214 565 | 4/1966 | B67C 3/06 |
| DE | 1 902 948 | 7/1970 | B67C 3/06 |
| DE | 30 40 880 | 5/1982 | B67C 3/26 |
| DE | 101 29 155 | 1/2003 | B67C 3/26 |
| DE | 201 20 014 | 3/2003 | B67C 3/02 |
| DE | 600 06 002 | 8/2004 | B67C 3/28 |
| DE | 103 43 281 | 4/2005 | B67C 3/10 |
| WO | WO 2009/050140 | 4/2009 | B67C 3/28 |

OTHER PUBLICATIONS

Chinese Office Action, dated Sep. 7, 2011 (7 pgs).

* cited by examiner

DEVICE FOR BOTTLING BEVERAGES

FIELD OF THE INVENTION

The present invention relates to a device for bottling beverages. Many devices such as this are known from the prior art. In these devices, starting from a storage container such as an annular vessel, a beverage that is to be bottled is bottled into the beverages via a supply line and a filling device.

BACKGROUND OF THE INVENTION

DE 103 43 281 A1 discloses a method and a device for producing and bottling oxygen-enriched fluids. This device comprises a filling member with a fluid valve, and also a nitrogen-filled chamber, wherein a through-connection for flushing and/or pre-charging the container with nitrogen can be established between the nitrogen-filled chamber and a container attached to the filling member.

DE 201 20 014 U1 describes a rotary filling machine for filling bottles. This rotary filling machine comprises a rotor which is rotatable about a vertical axis and on which a plurality of filling valves are arranged. The filling valves are connected to a fluid container via fluid lines.

DE 600 06 002 T2 describes a filling head with a flow that can be adjusted by means of a single device. In this case, there is provided in a discharge valve a valve body which is displaceable in the axial direction of the valve. By virtue of this valve body, an adjustable flow quantity reaches a bottling valve, which can function using just one single actuation device.

DE 30 40 880 A1 discloses a container filling member with a return air tube, wherein a permanent fluid barrier is provided in this return air tube. In this case, the return air tube is arranged directly in the filling member and the fluid barrier serves to allow a dry pre-charging for filling the containers.

DE 101 29 155 A1 discloses a filling member for container filling machines. This filling member comprises an outlet for the product, which can be closed by a valve having a valve seat and a movable valve body. The closing movement of this valve body is slowed at least in the end phase by a damping device. Here, too, the valve is arranged directly within the filling member.

Usually the containers to be filled are filled at a certain flow rate or at a maximum flow rate. Under certain circumstances however, for example if the containers that are to be filled break or if the containers exhibit a crack or a non-optimally cooled base after blowing, excessively high flow rates may occur in the filling valve. Due to this excessively high flow rate, considerable pressure shocks occur when the valve is closed, which cause stress on the filling valve and on the components and may even lead to failure of the gaskets.

The object of the present invention is therefore to provide a device for filling containers which prevents overloading of the filling valves at all times. In addition, the intention is also to provide a device which allows a switching of the filling valve during production, without a corresponding annular vessel having to be emptied in order to do this.

SUMMARY OF THE INVENTION

A device according to the invention for filling containers and in particular for filling containers with beverages comprises a storage container in which a fluid that is to be bottled in the containers can be accommodated. Also provided is a filling device which fills the fluid into the containers, and a transport line by means of which the fluid is transported from the storage container to the filling device. According to the invention, a valve device is arranged in the transport line between the storage container and the filling device, which valve device automatically switches between an open and a closed state depending on a flow rate of the fluid within the transport line.

The storage container is in particular, but not exclusively, an annular vessel in which the beverage that is to be bottled is arranged. The filling device is in particular a module which comprises a filling valve and which can but need not necessarily protrude at least partially into the containers that are to be filled. By virtue of the valve device according to the invention, pressure shocks are kept away from the filling device.

The valve device is preferably a non-return valve. The valve device is preferably configured in such a way that it moves from an open state to a closed state when a certain flow rate of the fluid is exceeded. This prevents the components of the filling device from being overloaded.

In one advantageous embodiment, the device comprises a flow measuring device and the valve device is arranged between the flow measuring device and the filling device. In a further advantageous embodiment, the valve device comprises a valve body made from a magnetic material which is arranged inside the transport line, and a magnet which is arranged outside the transport line.

In this case, this magnetic valve body is held in a certain position by the magnet and the fluid flows around it, so that the valve device is open in this position. When the flow rate exceeds a certain value, the valve body is wrenched out of its zero position and preferably closes an opening in the pipeline. This prevents any pressure shock on the filling device. Preferably, the distance between the magnet and the transport line is variable. In this way, the limit rate which leads to a closing of the valve can be varied. The distance between the magnet and the ball, the wall thickness of the housing, can also vary in order to vary the release force.

The use of such a combination of a magnet and a magnetic filling member is advantageous since a magnet, contrary to a spring for example, has its maximum force in the zero position of the valve body. If, therefore, the flow resistance of the valve body exceeds the holding force of the magnet, the valve body is immediately released and closes the valve. When using a spring, the valve body would move depending on the flow rate, and in this way it would be much more difficult to achieve a construction which produces no throttle effect.

Furthermore, the use of the magnetic body inside the transport line in combination with the magnet outside the transport line allows a particularly hygienic design of a non-return valve. The magnet is preferably an encapsulated magnet. Due to these qualities, use in general in product lines with strict requirements in terms of cleanliness and cleanability is possible, such as e.g. for foodstuffs, pharmaceutical products or the like.

In a further advantageous embodiment, the valve device has at least in some portions a larger internal cross-section than the transport line. This means that the valve body can move within certain limits inside the valve device and therefore can be displaced relative to the magnet.

Preferably, the cross-section of the valve body is larger than the internal cross-section of the portion of the transport line adjacent to the valve body. With particular preference, the maximum diameter of the valve body is larger than the maximum internal cross-section of the transport line. In this way, the valve body can largely close the transport line. In a further advantageous embodiment, the valve body is a ball. The use of a ball has the advantage that there is no need to ensure a precise geometric position or orientation thereof inside the valve device.

In a further advantageous embodiment, the magnet is arranged below the transport line. As a result, in a rest state of the valve device, the valve body is still moved towards the magnet by the force of gravity.

In a further advantageous embodiment, the device comprises a bypass line which bypasses the valve device. This means that for example the bypass line is branched off from the transport line upstream of the valve device and rejoins the transport line downstream of the valve device. In general, in order to move the ball out of the seat, i.e. in order to once again eliminate the closed position of the valve device, equal pressure must again be generated on the valve side and on the vessel side. This takes place by pre-charging the next bottle or the next container and opening the valve cone. It may be the case that the next bottle has to be filled in order to open the valve. The advantageous bypass line described here serves to make the pressure equalisation superfluous, since in this case the valve body cannot seal off the transport line completely. However, it would also be possible to provide the bypass line entirely inside the transport line. For example, the region of the transport line which is to be covered by the ball could be not exactly circular but rather may be embodied differently. In this case, even when covered by the ball, the entire cross-section of the pipeline is not covered.

It would also be possible to form the ball itself not with a smooth surface but rather to provide unevennesses such as flutes, so that a small amount of the fluid can pass into the transport line when the valve is closed.

In one preferred embodiment, therefore, said region of the transport line has an internal cross-section which differs from the external cross-section of the valve body.

Preferably, the bypass line has a smaller flow cross-section than the valve device in an open state. As a result, the flow rate does not exceed a predefined maximum value and thus no excessive loading of the filling device is possible when the valve device is closed.

BRIEF DESCRIPTION OF THE DRAWINGS

Preferred embodiments and further developments will emerge from the appended drawings.

In the drawings.

DETAILED DESCRIPTION OF THE INVENTION

Figure 1:
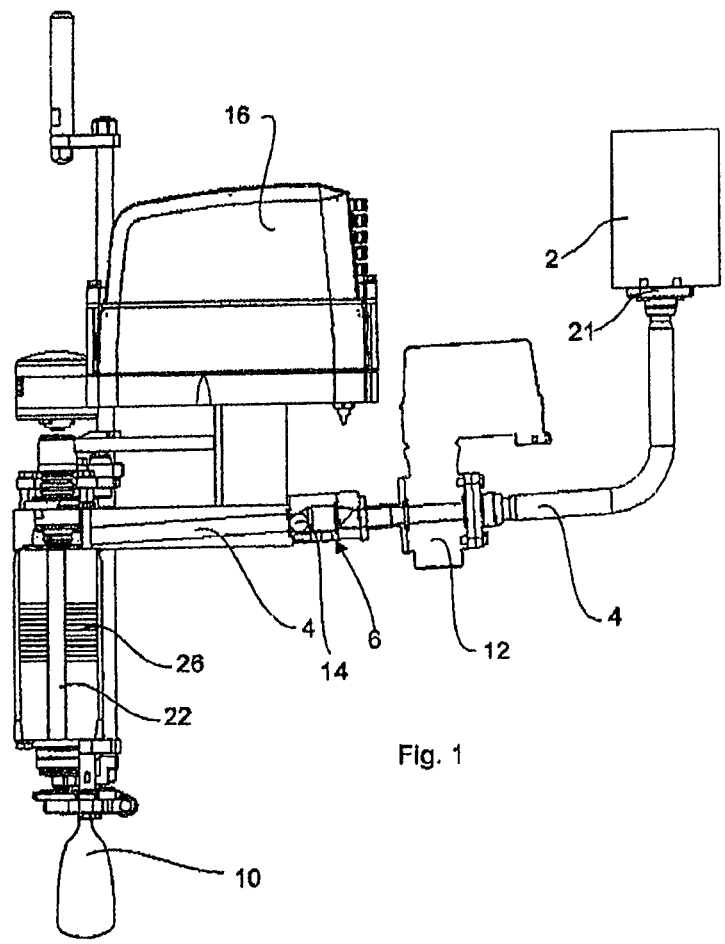
FIG. 1 shows a device according to the invention, the valve device being in a closed state here.

FIG. 1 shows an overall view of a device according to the invention for filling containers. Here, reference 2 denotes a storage container (shown only schematically), from which the medium or the beverage is filled into the containers (not shown) via a transport line 4. Reference 22 denotes a supply line, via which a gaseous medium such as carbon dioxide or nitrogen for example is supplied to the container 10. The beverage that is to be bottled is passed around this air line 22. For this purpose, a bellows-type seal 26 (shown only schematically) is provided, which controls the supply of the beverage into the containers.

In the event of faults, for example in the event of bottles breaking, it sometimes happens that the beverage that is to be bottled flows through this valve device 24 at high pressure and possibly damages the latter.

In order to avoid such damage, a valve device 6, which is embodied as a non-return valve, is provided inside the transport line 4. Reference 12 denotes a flow meter and reference 16 denotes in its entirety a supply unit for a gaseous medium. In this case, the bottling process for the beverage is controlled via a plurality of valves and valve paths. For example, via pneumatic means, the actual bottling process can be set in operation and the container can be supplied with carbon dioxide. In the diagram shown in FIG. 1, the device is in a state in which the valve device 6 is in a closed position, i.e. allows no flow or only a small flow of the beverage through the transport line. Reference 21 denotes a connection of the transport line to the storage container 2.

Figure 2:
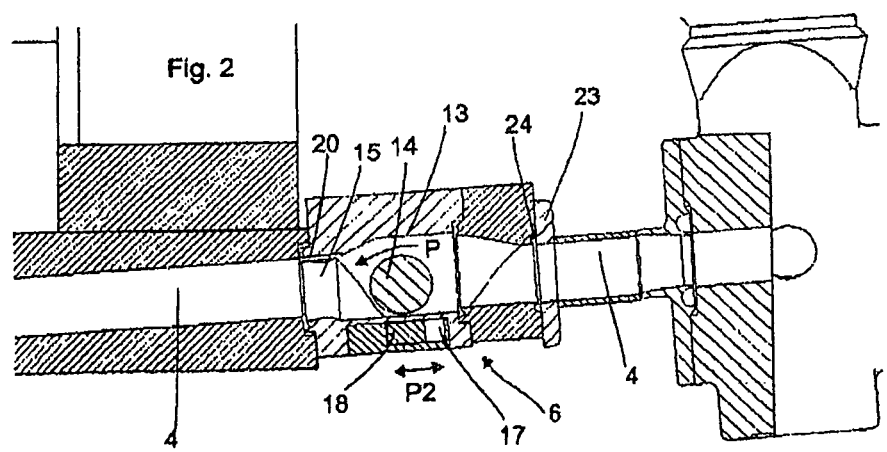
FIG. 2 shows a detailed view of the valve device according to the invention.

FIG. 2 shows a detailed view of the valve device 6, the valve device being in an open state here.

The valve body 14, which is a ball, is at a distance here from a seat 15 of the valve device, so that the beverage can move past the valve body 14 in the direction of the arrow P and can thus pass through the valve device 6. A magnet 18 is provided below the valve device, more specifically below the transport line 4, which magnet keeps the ball 14 in the open position in the normal working mode. It is also possible to shift the position of the magnet 18 within a recess 17 in the direction of the arrow P2. In this way, it is possible to set the flow rates at which the valve device 6 can move back from a closed state into an open state. If the ball 14 is located in the seat 15 and the magnet 18 is in the position shown in FIG. 2, the ball will be pulled back out of the seat 15 more quickly than if the magnet were to be arranged on the right-hand side within the recess.

In the open state, the fluid, i.e. the beverage, flows around the ball. If the flow rate exceeds a certain value, the ball is wrenched out of its zero position and closes the opening on the left-hand side.

Reference 24 denotes a sealing device for sealing off the valve device 6 with respect to the transport device 4 or a flange 23. Reference 13 denotes a widened region of the valve device 6, within which the ball 14 can move. Here, the valve device is configured in such a way that the lower region thereof 17, at which the magnet 18 is also arranged, runs in an essentially rectilinear manner and the upper region 13 is curved in order to allow the higher cross-section.

The valve body or the ball is thus held in the transport line by means of the magnetic coupling, thereby allowing a hygienic design which is particularly advantageous for aseptic applications in particular. The maximum flow is limited by this valve device and also a simple opening of the valve through pressure equalisation is possible.

Reference 20 shows in a highly schematic manner a bypass line, through which the fluid can flow even when the valve device is closed. However, other embodiments of this bypass line would also be possible here. For example, the seat 24 could be formed with a cross-section that is not exactly circular.

The described valve construction can also be used in applications where no storage container is provided and the product or the fluid is supplied for example from a rotary distributor directly to a filling device, or in general in pipelines which are installed upstream of e.g. a rotary distributor of a filling machine.

All of the features disclosed in the application documents are claimed as essential to the invention in so far as they are novel individually or in combination with respect to the prior art.

The invention claimed is:

1. A device for filling containers, comprising a storage container in which a fluid can be accommodated, a filling device which fills the fluid into the containers, and a transport line used to transport the fluid from the storage container to the filling device, wherein a valve device is arranged in the transport line between the storage container and the filling device, which valve device automatically switches between an open and a closed state depending on a flow rate of the fluid within the transport line, wherein the valve device comprises a valve body made from a magnetic material which is arranged inside the transport line, and a magnet which is axially movably arranged outside of and only below the transport line.

2. The device according to claim 1, wherein the valve device is configured to move from an open state to a closed state when a predetermined flow rate is exceeded.

3. The device according to claim 1, wherein the device comprises a flow measuring device and the valve device is arranged between the flow measuring device and the filling device.

4. The device according to claim 1, wherein the valve device has at least in some portions a larger internal cross-section than the transport line.

5. The device according to claim 4, wherein a cross-section of the valve body is larger than the internal cross-section of the portion of the transport line adjacent to the valve body.

6. The device according to claim 4, wherein the valve body is a ball.

7. The device according to claim 1, wherein the device comprises a bypass line which bypasses the valve device.

8. The device according to claim 7, wherein the bypass line has a smaller flow cross-section than the valve device in an open state.

9. A device comprising at least one transport line for the passage of fluids and/or products selected from the group consisting of a beverage, a foodstuff, an aseptic product and a pharmaceutical, wherein a valve device is arranged in the transport line, which valve device automatically switches between an open and a closed state depending on a flow rate of the fluid within the transport line, wherein the valve device comprises a valve body made from a magnetic material which is arranged inside the transport line and a magnet which is axially movably arranged outside of and only below the transport line.

10. The device according to claim 5, wherein a cross-section of the valve body is larger than an internal cross-section of the portion of the transport line adjacent to the valve body.

11. The device according to claim 5, wherein the valve body is a ball.

* * * * *